(12) United States Patent  
O'Neill

(10) Patent No.: US 7,831,497 B2
(45) Date of Patent: Nov. 9, 2010

(54) BETA ADJUSTMENT FOR LEVERAGED INDEX PRODUCTS

(75) Inventor: Daniel D. O'Neill, New York, NY (US)

(73) Assignee: Rafferty Asset Management, LLC, Boston, MA (US)

( * ) Notice: Subject to any disclaimer, the term of this patent is extended or adjusted under 35 U.S.C. 154(b) by 415 days.

(21) Appl. No.: 11/680,889

(22) Filed: Mar. 1, 2007

(65) Prior Publication Data

US 2008/0215499 A1 Sep. 4, 2008

(51) Int. Cl.
*G06Q 40/00* (2006.01)

(52) U.S. Cl. ...................... 705/36 R; 705/37

(58) Field of Classification Search ............... 705/36 R, 705/35, 37

See application file for complete search history.

(56) References Cited

U.S. PATENT DOCUMENTS 5,926,792 A * 7/1999 Koppes et al. .................. 705/4
2006/0100949 A1 * 5/2006 Whaley et al. ............. 705/36 R
2006/0277124 A1 * 12/2006 Gerrietts, II ................. 705/35

OTHER PUBLICATIONS

Rosalyn Retkwa, "Up Funds in a Down Market: How inverse index funds can work for clients—and brokers," On Wall Street. New York, May 1, 2003, p. 1. Retrieved from ProQuest.*

* cited by examiner

*Primary Examiner*—Charles R Kyle
*Assistant Examiner*—David L Wood
(74) *Attorney, Agent, or Firm*—Fish & Richardson P.C.

(57) ABSTRACT

A technique to provide a return from an aggregate of an investment in a cash equivalent account and a leveraged index product account over a time period that is substantially equivalent to a multiple of the return of a theoretical position in an underlying index for the period of time is provided by calculating in a computer system a benchmark exposure of the theoretical position in the underlying index corresponding to the index used in the leveraged index fund; and based on the benchmark exposure, determining whether to initiate a transaction to re-allocate funds from the leveraged index product to a cash equivalent account or from the cash equivalent account to the leveraged index product according to the determined daily benchmark exposure.

42 Claims, 9 Drawing Sheets

BETA ADJUSTMENT FOR LEVERAGED INDEX PRODUCTS

BACKGROUND

This invention relates to leveraged index products and, in particular, leveraged mutual funds and leveraged exchange traded funds (ETF's).

Traditional index funds allow an investor to invest in a single instrument that generally replicates the performance of a benchmark index. Leveraged index products, on the other hand, seek to return a multiple of the return of an underlying benchmark over a period of time that generally coincides with the frequency of the product's determination of its net asset value.

Generally, leveraged index funds seek to return a multiple of the daily return of an underlying index because these funds are required to calculate a daily net asset value. Each calculation of net asset value yields a new level of net assets and, therefore, a new base upon which the multiple of the return is based.

The extent to which a leveraged index product provides a multiple of the return of the benchmark index is generally referred to as the "Beta" of the product. For example, the Direxion S&P 500® Bull 2.5× Fund aims to provide a return that is 2.5 times (e.g., 250%) the daily return of the S&P 500 Index® and thus is a Fund with a beta of 2.5.

Leveraged index products attempt to achieve the stated return by providing exposure to the benchmark in an amount equal to the product of the beta of the fund and the fund's net assets each day. For instance, if an investor makes a $100,000 investment in the Direxion S&P 500® Bull 2.5×, at the net asset value on a given day, the investor will receive the equivalent of $250,000 of exposure to the S&P 500 Index® for the following day. If the value of the S&P 500 Index® rises by 1% the next day, the 1% gain on the $250,000 of exposure would translate into a gain of 2.5% on the investor's $100,000 investment. Conversely, if the S&P 500 Index® declines 1%, the 1% loss on the $250,000 of exposure would translate into a 2.5% loss on the investor's $100,000 investment.

SUMMARY

Leveraged index products seek to provide a return which is a multiple of the return of a target index for a stated, limited period of time. However, the return of a leveraged index product for a period longer than the stated, limited period is not necessarily equivalent to magnifying the return of the benchmark by the relevant multiple for the period of time. That is, compounding successive, magnified, periodic returns introduces a path dependency that impacts returns for periods longer than the stated limited period of time.

According to an aspect of the present invention, a computer implemented method includes periodically calculating in a computer system, a theoretical position in an underlying index corresponding to an index used in a leveraged index product account and based on the theoretical position, determining the level of investment in a leveraged index product account that is required to provide substantially the same exposure to the underlying index as the exposure provided by the theoretical position in the underlying index.

The following are embodiments within the scope of the invention.

The method includes determining whether to initiate a transaction to re-allocate funds from the leveraged index product account to a cash equivalent account or from the cash equivalent account to the leveraged index product account according to the determined theoretical position in the underlying index. The method includes executing the determined transaction to re-allocate funds between the leveraged index product account and the cash equivalent account according to the determined theoretical position in the underlying index.

The method attempts to provide a return from the aggregate investment in the cash equivalent and the leveraged index product account that is substantially equivalent to a multiple of the cumulative return of the theoretical index over the period of time.

Calculating the theoretical position includes calculating a Theoretical Benchmark Exposure by selecting a model to provide the exposure of the theoretical position in the underlying index corresponding to the index used in the leveraged index fund.

Determining whether to initiate a transaction includes determining a desired investment in a leveraged index product based on the theoretical position in the underlying index, comparing the desired investment in the leveraged index product to the current value of funds in the leveraged index product and, if the current value exceeds the desired value by more than a specified tolerance, sending a message to recommend a transfer of funds from the leveraged index product account to the cash equivalent account.

Determining whether to initiate a transaction includes determining a desired investment in a leveraged index product based on the theoretical position in the underlying index, comparing the desired investment in the leveraged index product to the current value of funds in the leveraged index product account and, if current value exceeds the desired value by more than a specified tolerance, the difference is more than expected, using an automated system to transfer funds from the leveraged index product account to the cash equivalent account.

Determining whether to initiate a transaction includes determining a desired investment in a leveraged index product based on the theoretical position in the underlying index, comparing the desired investment in the leveraged index product to the current value of funds in the leveraged index product and, if the desired value exceeds the current value by more than a specified tolerance, sending a message to recommend a transfer of funds from the cash equivalent account to the leveraged index product account.

Determining whether to initiate a transaction includes determining a desired investment in a leveraged index product based on the theoretical position in the underlying index, comparing the desired investment to the current value of the funds in the leveraged index product and, if the desired value exceeds the current value by more than a specified tolerance, using an automated system to transfer funds from the cash equivalent account to the leveraged index product account.

The cash equivalent account is held in a money market account that is linked to the leveraged index product. The theoretical position in the underlying index is a Theoretical Benchmark Exposure (TBE), which at any time is determined according to:

$$(TBE) = K*P*(1+X)*((K-1)*(P)*(r)*(ip)).$$

where "P" is an amount of allocated assets; "K" is an leverage multiple of P; where the value of K is less than a beta of the leveraged fund; "X" is the return of the underlying index; "r" is the broker call rate and "ip" is the investment period.

The method includes monitoring the cash equivalent account and the leveraged index product account for determining whether to initiate a transaction. Periodic calculations occur on days when the leveraged index product trades products that are based on the underlying index.

According to an additional aspect of the present invention, a computer program product residing on a computer readable medium for rebalancing exposure to an underlying index in a leveraged index product comprises instructions for causing a computer to periodically calculate in a computer system, a theoretical position in an underlying index corresponding to an index used in a leveraged fund; and based on the theoretical position, determine the level of investment in a leveraged index product account that is required to provide substantially the same exposure to the underlying index as the exposure provided by the theoretical position in the underlying index.

According to an aspect of the present invention, an apparatus includes a processor and memory for executing along with the processor a computer program product. The apparatus also includes a computer readable medium storing the computer program product. The computer program product for rebalancing exposure to an underlying index in a leveraged index product comprises instructions for causing a computer to periodically calculate in the computing system, a theoretical position in an underlying index corresponding to an index used in a leveraged fund; and based on the theoretical position, determine the level of investment in an leveraged index product account that is required to provide substantially the same exposure to the underlying index as the exposure provided by the theoretical position in the underlying index.

According to an aspect of the present invention, a memory for storing data for access by an application program for managing leveraged index products, the application program being executed on a data processing system includes a data structure scored in said memory, the data structure including information resident in a database used by said application program and including, a field identifying the leveraged index product, a field identifying a cash account, a field identifying a leveraged index product account associated with the cash account, and a field identifying exposure rebalancing options for the leveraged index product account.

One or more aspects of the invention may include one or more of the following advantages.

The invention provides a mechanism to offset or counterbalance the path dependency in pricing of leveraged index products, including daily beta leveraged index produces.

The invention can re-allocate funds among cash or cash equivalents, and an account that holds a leveraged index product to provide a return from the aggregate over a time period that is substantially equivalent to a multiple of the return of the index over the period of time.

In essence, this provides a mechanism that permits investors to seek leveraged index returns for periods longer than the period for which the products attempt to provide such returns.

Based on a determined desired investment in a leveraged index product messages to recommend a transfer of funds can be sent to request the transfers or an automated system can be used to transfer funds between the leveraged index product account and the cash equivalent account.

The details of one or more embodiments of the invention are set forth in the accompanying drawings and the description below. Other features, objects, and advantages of the invention will be apparent from the description and drawings, and from the claims.

DESCRIPTION

Figure 1:
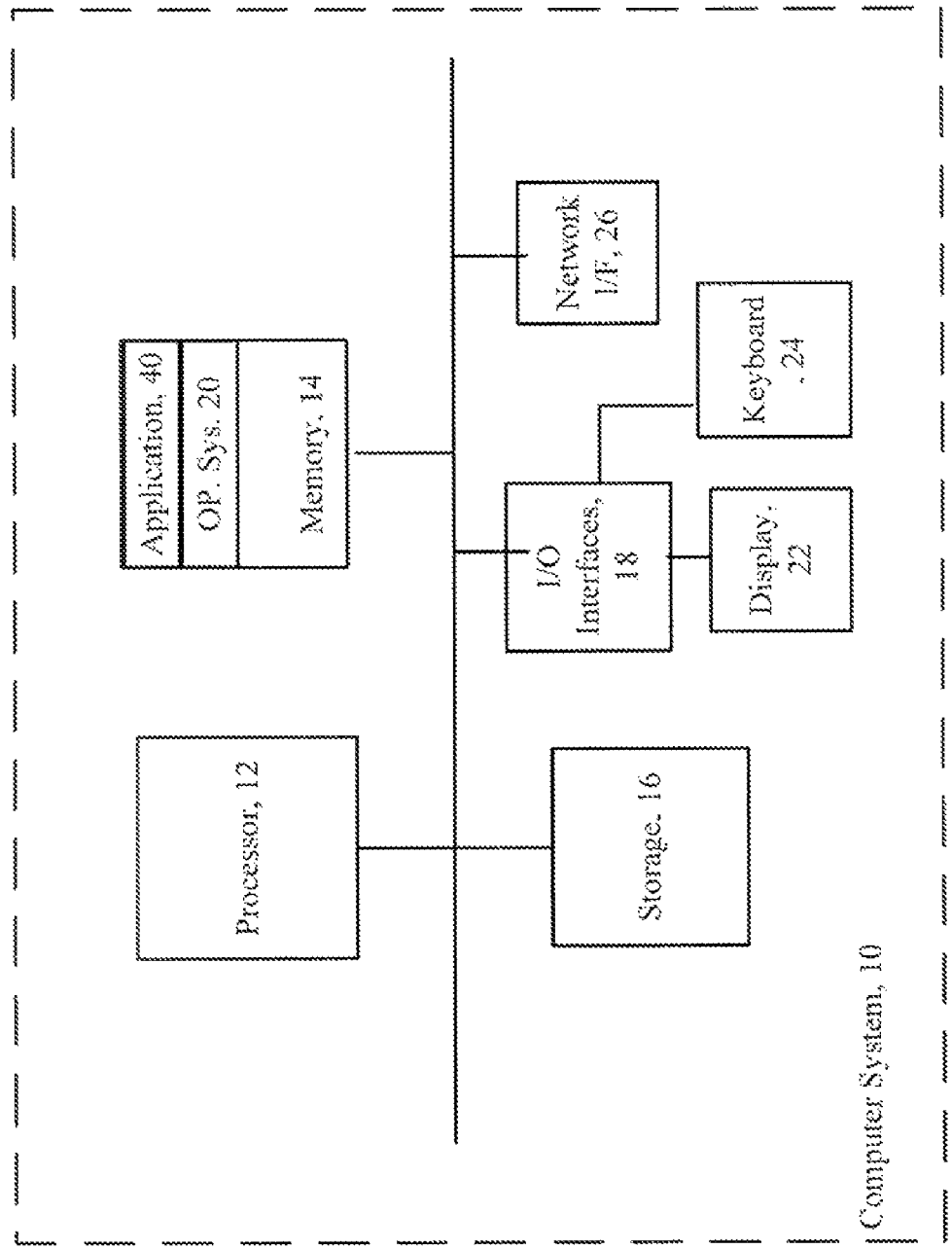
FIG. 1 is a block diagram of a computer system.

Referring to FIG. 1, a computer system 10 includes a processor 12, main memory 14, storage 16, various interfaces 18 as well as I/O devices such as a display 22 and keyboard 24 (as well as a mouse, etc.). The computer system 10 also includes a network interface 26 that can be any network interface, such as Ethernet, dial up, wireless etc. As shown, the memory has an operating system 20 and application software 40 that are executed by the processor to assist with re-allocation assets of leveraged index products, such as leverage index funds to provide exposure adjustments correction, as discussed below.

The application software 40 can be configured to monitor investments in leveraged index funds that provide daily beta exposure. For example, the software can work with the DirexionFunds® S&P 500® Bull 2.5× Fund, which aims to achieve a daily return that is 2.5 times (e.g., 250%) of the daily return of the S&P 500 Index®, an equities benchmark.

Although a single computer system 10 configuration, that is, a personal computer is shown, other configurations can be used such as client-server configurations. In that situation, typically many such server systems could be in communication with client systems and the software application can have client and server components that execute on the respective systems. In either situation, the computer system 10 receives messages and data from other systems in order to determine exposure adjustments.

In addition, the application software 40 can be executed on different computers, controlled by or managed by different entities that are involved in any of the aspects of leveraged index products. For example, in some embodiments, investors can use a tool as will be discussed below to execute the application software 40, whereas in other embodiments this tool can be used by broker dealers that have control over customer accounts invested in the leveraged product. In still other embodiments, the issuer of the leverage index products can use the application software 40 and either apply the results of the execution of the application software 40 to the funds in their entirety or to those accounts that it has access to or to generate messages to investors and/or broker dealers to recommend transactions that result from execution of the software application. In still other embodiments, spreadsheets are used to aid in determination of exposure rebalancing positions.

Understanding the Implications of Daily Betas

In general, open-ended products that offer daily or otherwise frequent liquidity cannot seek leveraged index returns for periods longer than the period between successive net asset value calculations because each calculation necessarily yields a new level of net assets that necessitates revised, magnified exposure to the benchmark performance. Generally, this period between successive calculations is daily (trading days in the market that trades the benchmark). Other periods could be used.

Changing exposure to the benchmark essentially starts a new period. By changing exposure to the benchmark, these changes have a compounding effect on exposure to the benchmark. Compounding of exposure causes daily beta products to exhibit changes in exposure that are path dependent. That is, for the same set of price changes in the benchmark, the exposure changes can be very different over the set of price changes, depending on the sequence which the price changes occur. As a consequence, seeking daily returns has implications that are not intuitive, as will become apparent from the discussion below.

Table I shows: (A) the performance of a hypothetical benchmark, which could be, for instance, the S&P 500 Index®, over a period of four days; (B) 250% of the cumulative performance of the index at each point during the four days; and (C) expected return of a daily beta index product, e.g., the DirexionFunds® S&P 500® Bull 2.5× Fund that seeks 250% of the daily return of the index, the changes in net assets on each of the days based on the daily beta model (D) and a cumulative beta model (E).

TABLE I

| | | 2.5 Daily Beta Model | | | | 2.5 Cumulative Beta Model | |
| --- | --- | --- | --- | --- | --- | --- | --- |
| Period | Benchmark Value | Benchmark Daily Return (A) | Benchmark Daily Return × Beta = 2.5 (B) | Daily Beta Model Net Assets (E) | Benchmark Cumulative Return | Benchmark Cumulative Return × Beta = 2.5 (C) | Theoretical Net Assets (D) |
| Day 0 | 100 | | | | | | 100.00 |
| Day 1 | 105 | 5.00% | 12.50% | 100.00 | 5.00% | 12.5% | 112.50 |
| Day 2 | 110 | 4.76% | 11.90% | 112.50 | 10.00% | 25.00% | 125.00 |
| Day 3 | 115 | 4.55% | 11.36% | 140.20 | 15.00% | 37.5% | 137.50 |
| Returns | | | | 40.2% | | | 37.5% |

Table I shows that by providing a succession of daily returns equal to 250% of the daily return of the benchmark results in a total return of 40.20% for the leveraged fund, which is higher than the return of 37.50% for a theoretical position that provides 250% of the return of the benchmark for the same period based on a cumulative Beta model.

TABLE II

| | | | 2.5 Daily Beta Model | | 2.5 Cumulative Beta Model | |
| --- | --- | --- | --- | --- | --- | --- |
| Period | Benchmark Value | Benchmark Daily Return | Net Assets (F) | Leveraged Index Benchmark Exposure (H) | Net Assets (G) | Theoretical Benchmark Exposure (I) |
| | 100 | | 100.00 | $250.00 | 100.00 | $250.00 |
| Day 1 | 105 | 5.00% | 112.50 | $281.25 | 112.50 | $262.50 |
| Day 2 | 110 | 4.76% | 125.89 | $314.73 | 125.00 | $275.00 |
| Day 3 | 115 | 4.55% | 140.20 | $350.50 | 137.50 | $287.50 |

As shown in Table II, both the Daily Beta Model and the Cumulative Beta Model provide 250% of the return of the benchmark and have an initial $100.00 in assets (F) and (G) and consequently $250 of Leveraged Index Benchmark Exposure (H) and Theoretical Benchmark Exposure (I) prior to Day One. Thus, the benchmark's 5% Day One gain increases the net assets from $100.00 to $112.50 for both the Daily Beta Model and the Cumulative Beta Model.

At that point, the Daily Beta Model exposes 250% of the new Net Assets to benchmark performance on Day Two. The resulting Leveraged Index Benchmark Exposure is ($112.50*2.5) $281.25. In contrast, the Cumulative Beta Model exposes 250% of the original $100 in assets to the benchmark performance for Day 2 but exposes only 100% of the gain, i.e., the $12.50, to the benchmark performance. As a consequence, the Theoretical Benchmark Exposure on Day 2 is ($100*2.5+12.50) $262.50.

When the benchmark gains on Day Two, the Daily Beta Model's gains again are greater than those of the Cumulative Beta Model because the Leveraged Index Benchmark Exposure was greater than the Theoretical Benchmark Exposure. The same is true on Day Three. The Daily Beta Model thus provides more gains than the Cumulative Model for the Three Day period.

When a benchmark declines sharply over three days, as the example below shows, the Daily Beta Model declines less than the Cumulative Beta Model (−34.57% vs. −37.50%).

TABLE III

| Period | Benchmark Value | Benchmark Daily Return | Benchmark Daily Return × Beta = 2.5 | Fund Net Assets | Benchmark cumulative return | Benchmark cumulative return × Beta | Net Assets |
| --- | --- | --- | --- | --- | --- | --- | --- |
| Day 0 | 100 | | | 100.00 | | | 100.00 |
| Day 1 | 95 | −5.00% | −12.50% | 78.5 | −5.00% | −12.5% | 87.50 |
| Day 2 | 90 | −5.26% | −13.50% | 75.99 | −10.00% | −25.00% | 75.00 |
| Day 3 | 85 | −5.56% | −13.89% | 65.43 | −15.00% | −37.5% | 62.50 |
| Returns | | | | −34.57% | | | −37.50% |

As shown in Table IV below, both models have $100.00 in assets and $250 in benchmark exposure prior to Day One (Day 0). The benchmark's 5% Day One loss decreases net assets from $100.00 to $87.50 in both cases. The Daily Beta Model, however, reduces exposure to the benchmark movement on Day Two, resulting in $218.75 of benchmark exposure. The Cumulative Beta Model, on the other hand, does not reduce exposure beyond the losses already incurred, so the Cumulative Beta Model has $237.50 in benchmark exposure on Day Two.

When the benchmark declines on Day Two, the Daily Beta Model's losses again are less severe than those of the Cumulative Beta Model. The same is true on Day Three, which is why the Daily Beta Model has better performance than the Cumulative Beta Model for the three-day period.

TABLE IV

| Period | Benchmark Value | Benchmark Daily Return | 2.5 Daily Beta Model | | 2.5 Cumulative Beta Model | |
| --- | --- | --- | --- | --- | --- | --- |
| | | | Net Assets (F) | Leveraged Index Benchmark Exposure (H) | Net Assets (G) | Theoretical Benchmark Exposure (I) |
| | 100 | | 100.00 | $250.00 | 100.00 | $250.00 |
| Day 1 | 95 | −5.00% | 78.5 | $218.75 | 87.50 | $237.50 |
| Day 2 | 90 | −5.26% | 75.99 | $189.97 | 75.00 | $225.00 |
| Day 3 | 85 | −5.56% | 65.43 | $163.58 | 62.50 | $212.50 |

Thus, one could conclude that the Daily Beta Models are inherently superior to Cumulative Models because in up markets the performance of Daily Beta Models (e.g., gains) is higher and in down markets the performance (e.g., losses) is not as poor as that of the Cumulative Beta Models.

However, this is not necessarily true, because, as will be discussed below, the returns for each model are path dependent, e.g., the set of price movements that the benchmark takes during a period will have different consequences for each of the models.

Since the Daily Beta models increases exposure in response to gains and decreases exposure in response to losses, it has some inherent advantages in markets which are linear and directional, i.e., days when the benchmark increases in value are followed in succession and days when the benchmark decreases in value are followed in succession. However, most markets are not linear and are directional only over relatively short periods of time.

For example, consider a market which is up and down but ultimately flat, as illustrated in the example of Table V.

TABLE V

| Period | Benchmark value | Benchmark daily return | Benchmark daily return × Beta = 2.5 | Fund net assets | Benchmark cumulative return | Benchmark cumulative return × Beta | Net Assets |
| --- | --- | --- | --- | --- | --- | --- | --- |
| | 100 | | | 100.00 | | | 100.00 |
| Day 1 | 105 | 5.00% | 12.50% | $112.50 | 5.00% | 12.50% | $112.50 |
| Day 2 | 100 | −4.76% | −11.90% | $ 99.11 | 0.00% | 0.00% | $100.00 |
| Day 3 | 105 | 5.00% | 12.50% | $111.50 | 5.00% | 12.50% | $112.50 |
| Day 4 | 100 | −4.76% | −11.90% | 98.22 | 0.00% | 0.00% | $100 |
| | | | (K) | | | $ | (L) |

In this example, the Daily Beta Model provides losses (K), whereas the Cumulative Model and the underlying benchmark show no change (L) over the four day period.

This scenario can be explained by reference to Table VI.

TABLE VI

| Period | Benchmark Value | Benchmark Daily Return | 2.5 Daily Beta Model | | 2.5 Cumulative Beta Model | |
|---|---|---|---|---|---|---|
| | | | Net Assets (F) | Leveraged Index Benchmark Exposure (H) | Net Assets (G) | Theoretical Benchmark Exposure (I) |
| Day 0 | 100 | | $100.00 | $250.00 | $100.00 | $250.00 |
| Day 1 | 105 | 5.00% | $112.50 | $281.25 | $112.50 | $262.50 |
| Day 2 | 100 | −4.76% | $ 99.11 | $247.77 | $100.00 | $250.00 |
| Day 3 | 105 | 5.00% | $111.50 | $278.74 | $112.50 | $262.50 |
| Day 4 | 100 | −4.76% | $ 98.22 | $245.56 | $100.00 | $250.00 |

As, shown in Table VI, both models have $100.00 in assets (M) and (N) and $250 in benchmark exposure (O) and (P) prior to Day One (Day 0), and when the underlying benchmark's gains 5%, the gain increases the net assets of both models from $100.00 to $112.50. However, the Leveraged Index Benchmark Exposure on Day 2 is 250% of $112.50, or $281.25 while the Theoretical Benchmark Exposure is only $262.50. When the benchmark declines on Day Two, the Daily Beta Model's losses are greater than those of the Cumulative Beta Model. In response to the decline in net assets caused by Day Two's losses, the Daily Beta Model reduces the net benchmark exposure at day Three, a day when the market gains.

Responding to the increase in net assets due to gains on Day Three, the Daily Beta Model increases exposure, only to lose when the benchmark declines on Day Four. Thus, on Day 4 with the benchmark back at the initial value of 100 based on the decline of −4.76% on Day Four, the Daily Beta Model only has $98.22 of net assets, for exposure of only $245.56, whereas the Cumulative Model has assets of $100.00 for exposure of $250.00.

Application software 40 assists with exposure modification by recommending re-allocation of assets between an investor's leveraged product account and cash or cash equivalent account. The application software 40 is executed as a computer implemented process.

Figure 2:
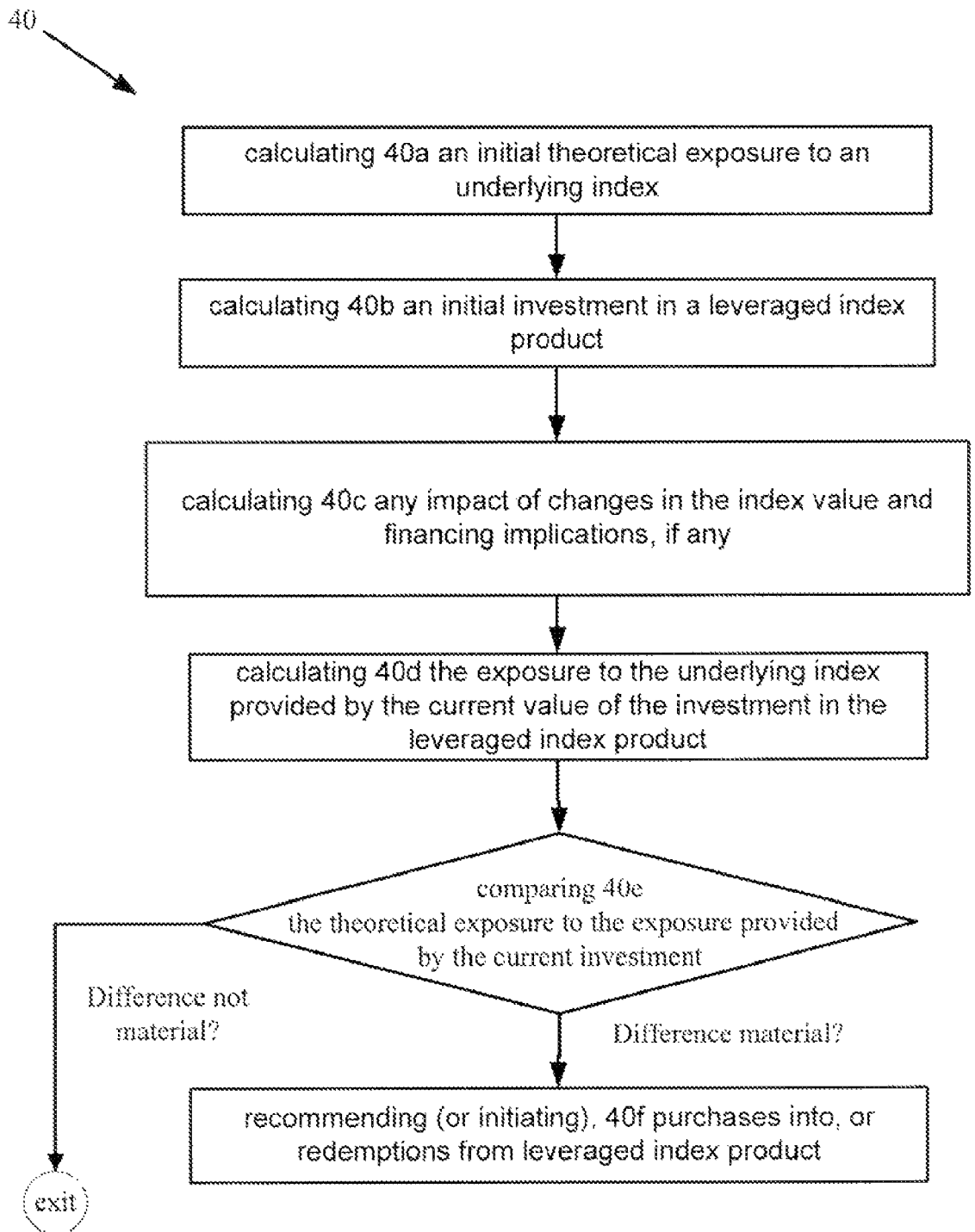
FIGS. 2-5 are flow charts depicting processes for re-allocating exposure in leveraged products.

Referring to FIG. 2, high level features of the application software 40 are illustrated. These features include calculating 40*a* in a computer system, an initial theoretical exposure to an underlying index given an initial level of assets and a degree of magnification of such assets to the relevant index. The application software also includes calculating 40*b* in a computer system, an initial investment in a leveraged index product selected to provide a level of exposure to the underlying index in an amount that is equivalent to the theoretical exposure determined at 40*a*. The application software also includes calculating 40*c* any impact of changes in the index value and financing implications, if any, to determine a current theoretical exposure and calculating 40*d* in a computer system the exposure to the underlying index provided by the current value of the investment in the leveraged index product. The application software also includes comparing 40*e* the theoretical exposure to the exposure provided by the current investment in the leveraged index product and, if there is a material difference, recommending (or initiating) 40*f* purchases into, or redemptions from, the leveraged index product to attempt to ensure that the exposure to the underlying index provided by the investment in the leveraged index product is at least roughly equivalent to the theoretical exposure.

The application software 40 is a tool that an investor or other entity can use to reallocate funds to balance market exposure in a leveraged product, such as a leveraged benchmark mutual fund to provide returns that are consistent with the market exposure the investor would have had the investor invested in a cumulative beta product.

In other words, referring back to Table II above, the application software 40 in combination with execution of recommended transactions provides the investor's investment in the Fund with a Leveraged Index Benchmark Exposure that is substantially equal to the Theoretical Benchmark Exposure of Table II (or Table IV).

The application software 40 permits investors, broker/dealers, issuers, and so forth, to re-balance exposure in accounts holding leveraged funds in a manner that generates returns over a period of time that are equivalent to a multiple ("K") of the cumulative total return of a Theoretical benchmark for the relevant period. The parameter "K" is a positive number for products that provide so called "long exposure," whereas the parameter "K" is a negative number for products that provide "short exposure."

Essentially, the multiplier K can have a range of values between the Beta of the leveraged index product and 0. (If the leveraged indexed products are paired (e.g., a pair of funds such as a Bull fund and a Bear fund on the same benchmark), the multiplier K can have a range of values between the Beta of the long product (Bull Fund) and the Beta of the short product (Bear Fund).

If the leveraged product is a long product (and has a positive Beta), the value of K is less than the Beta, to permit an allocation to cash or a cash equivalent so that Beta−K=MM can occur. If the leveraged product is a short product (and has a negative Beta), the value of K is greater than the Beta, to permit an allocation to cash or a cash equivalent so that K−Beta=MM can occur.

In general, the value of K is a percentage of Beta. For leveraged products that have relatively high Betas or are based on benchmarks with relatively high volatility, the value of K will generally be lower than for those leveraged products with relatively lower Betas or which are based on benchmarks with relatively lower volatility. Thus, a relatively low volatility fund could have K=0.85 B, whereas a higher volatility fund might have a K=0.75 B. In general, K can be about 0.5 B to 0.9 B, more likely around 0.8 B.

Figure 3:
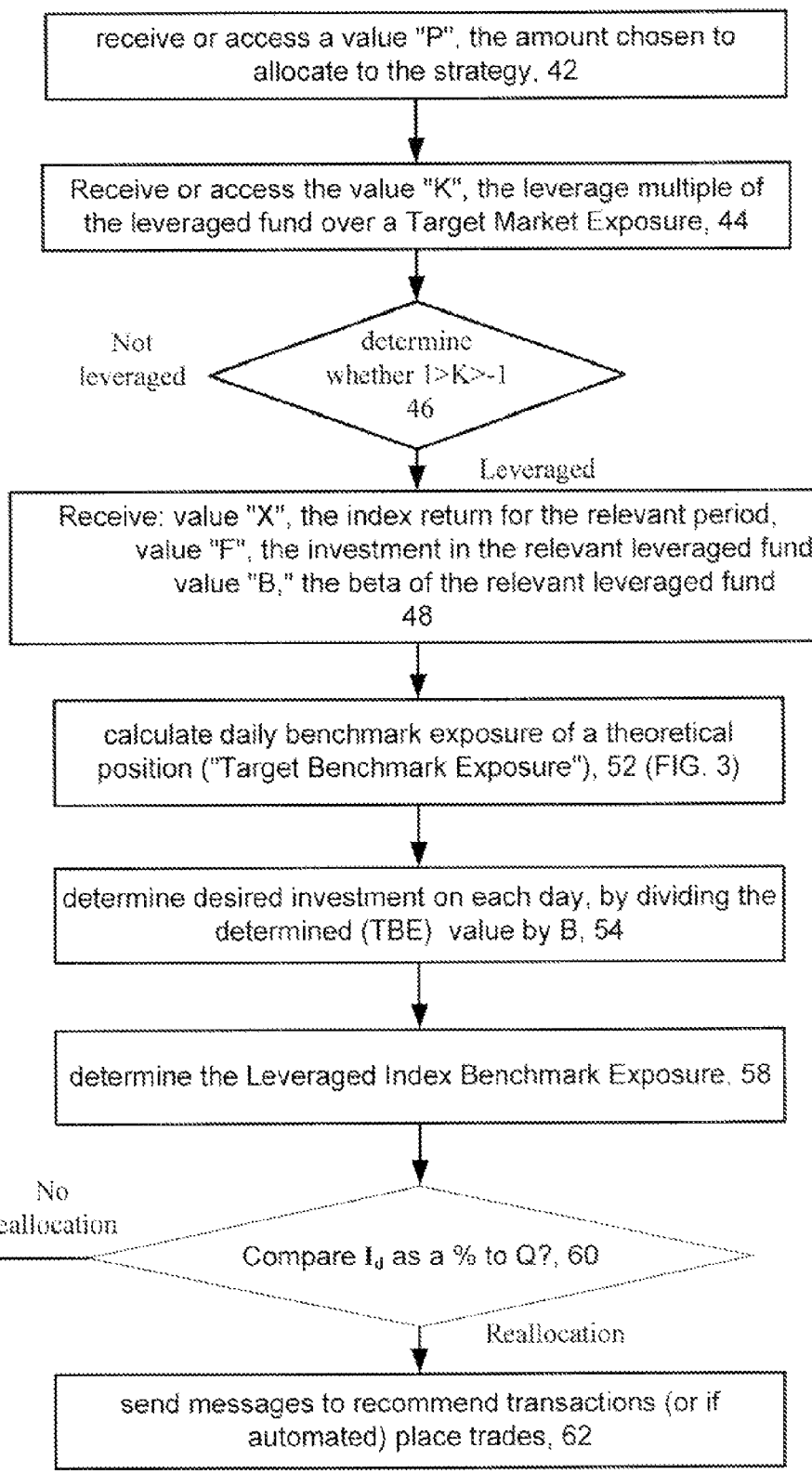

Referring now to FIG. 3, specifics of an embodiment of the application software 40 are described. The application software 40 receives or accesses 42 a value "P", which is the amount that the user (e.g., investor, broker/dealer, issuer, etc.) chooses to allocate to the strategy. The application software 40 also receives or accesses 44 the value "K" which is the leverage multiple that the investor desires to apply to P so that the Theoretical Benchmark Exposure is equal to K*P, where the symbol "*" here will be understood to correspond to a multiplication operation.

The application software 40 determines 46 whether K>1 or K<−1. The value of K−1 corresponds to that portion of the Theoretical Market Exposure that is provided using leverage, and therefore will incur borrowing costs. If, 1>K>−1, there is no leverage required. The cost of leverage is a factor in determining the Theoretical Benchmark Exposure because the cost of leverage reduces the Theoretical Benchmark Exposure.

Thereafter, the application software also receives 48 the value "X" which is the benchmark return for the relevant period, the value "F", the investment in the relevant leveraged product and the value "B," which is the Beta of the relevant leveraged product.

The application software 40 calculates 52 a daily benchmark exposure of a theoretical position (e.g., "Theoretical Benchmark Exposure" as discussed below). The application software 40 determines 54 a desired investment (T) on each day, by dividing the determined benchmark exposure, e.g., Theoretical Benchmark Exposure (TBE) value by B, the beta of the leveraged product.

$$(T) = TBE/B$$

The application software 40 also multiplies the current investment (CI) in the investor's leveraged index product account by the Beta B of the leveraged index product to determine 58 the Leveraged Index Benchmark Exposure (LIBE).

$$(LIBE) = CI*B$$

The Leveraged Index Benchmark Exposure (LIBE) is subtracted 58 from the Theoretical Benchmark Exposure and the difference between Leveraged Index Benchmark Exposure and the Theoretical Benchmark Exposure. This difference (LIBE)−(TBE) is divided by the Beta B of the leveraged index product to determine an amount $I_d$ by which the investment in the investor's leveraged index product account differs from the Theoretical value or:

$$I_d = (LIBE - TBE)/B$$

If the difference $I_d$ is substantial, 60 the software sends messages to recommend transactions (or in the case of an automated system places trade(s)) 62.

Generally, the difference $I_d$ between the current investment in the investor's leveraged index product account and the Theoretical Benchmark Exposure is expressed as a percentage of the current investment in the investor's leveraged index product account. Thus the difference $I_d\%$ expressed as a percentage is:

$$I_d\% = I_d/CI$$

If the absolute value of the difference Id/CI is more than a threshold percentage, Q, then the messages or transactions will occur. An exemplary range for Q can be 0.5% to 3%. However other ranges can be used. For instance, if transaction costs are minimal, the range can be substantially lower than 0.5%, whereas if transaction costs are more of a concern, the range could be higher than 3%, e.g. up to 5% or more. In addition, in those embodiments in which transactions are recommended, rather than automatically executed, even if the deviation is beyond the range, the messages will still be sent.

Figure 4:
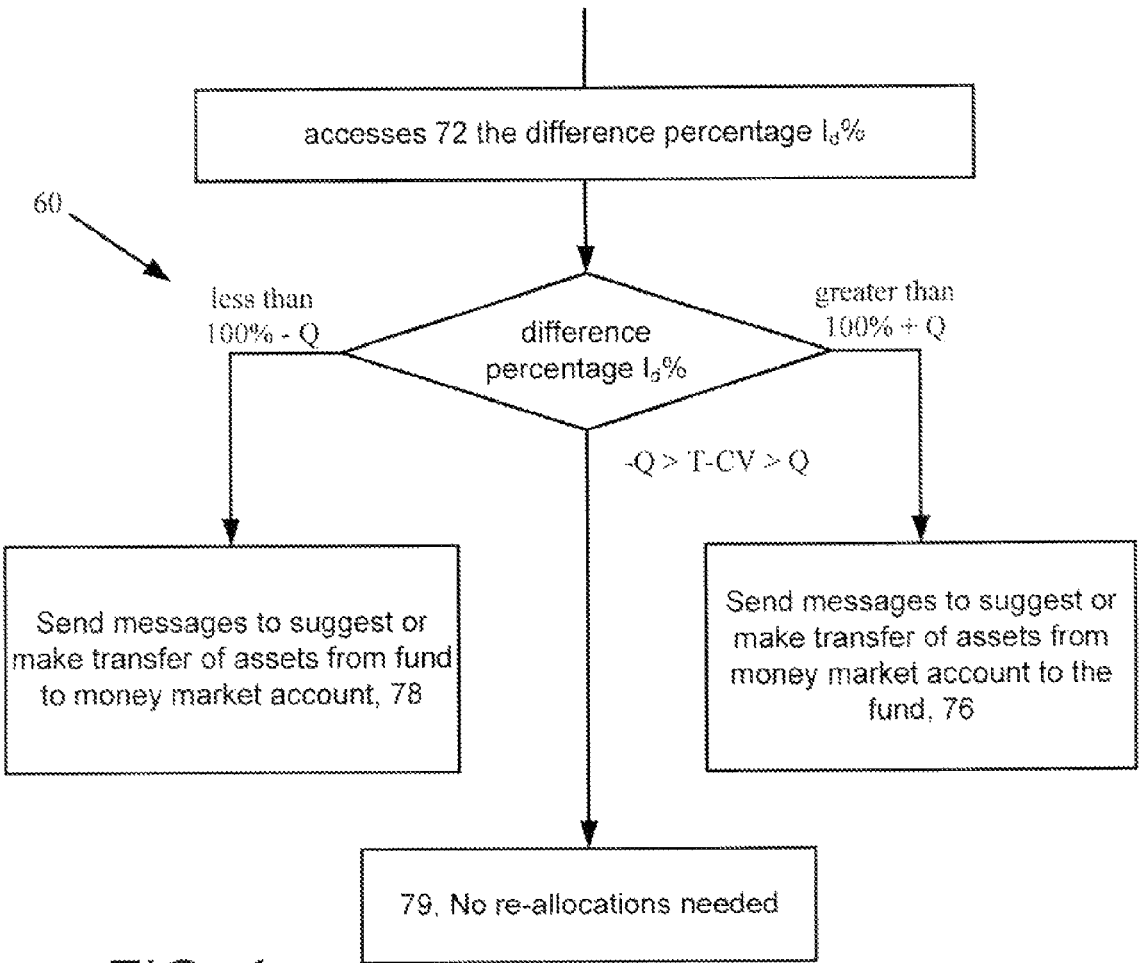

Referring now to FIG. 4, details 60 on how the application software 40 determines the types of transfers or messages needed to rebalance the leveraged fund exposure to the underlying index are shown. The application software 40, accesses 72 the difference percentage $I_d\%$ as determined above.

Recall that $I_d = (LIBE-TBE)/B$, and $I_d\% = I_d/CI$ if the difference percentage $I_d\%$ indicates that the investment in the leveraged index product is greater than 100%+Q of the target investment in the leveraged index product, meaning the investment in the leveraged index product falls outside the range on the high end, the application software 40 will suggest 76 a transfer of assets from the Investor's Leveraged index product to cash or cash equivalent or automatically transfer the assets according to the preferences of the investor.

On the other hand, if the difference percentage $I_d\%$ indicates that the investment in the leveraged, index product is less than 100%−Q of the target investment in the leveraged index product, meaning the investment in the leveraged index product falls outside the range on the low end, the application software 40 will suggest 78 a transfer of assets from the Investor's cash or cash equivalent to the leveraged index product or automatically transfer the assets according to the preferences of the investor. In other situations 79 there are no recommendations or transfers needed.

Thus, the Theoretical Benchmark Exposure TBE is used to rebalance exposure in a leverage product by allocation of a portion of the assets in the leveraged product to a money market account or vice versa based on movements in the underlying benchmark that the leveraged product tracks.

The application software 40 can automatically move funds into and out of a position in order to mimic the baseline investment on a periodic basis or these changes can be performed manually by a user. Exposure correction is accomplished by using an estimated closing value of the index to compute the cumulative return from the start of the investment.

Theoretical Benchmark Exposure

Figure 5:
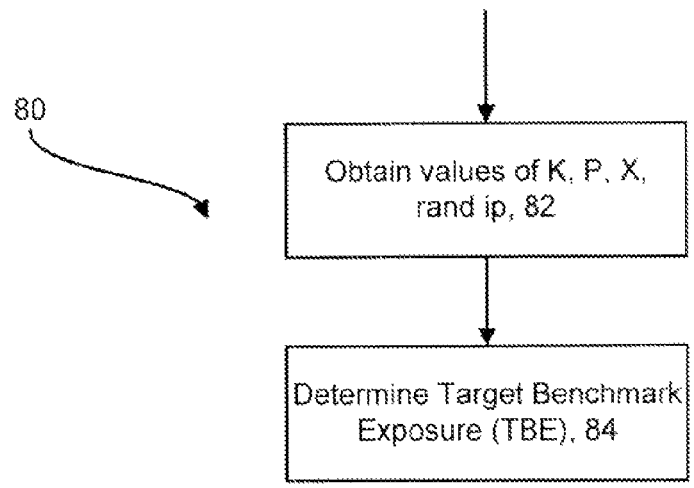

Referring now to FIG. 5, determination of the TBE (Theoretical Benchmark Exposure) is shown. Initially, the investor, broker/dealer, issuer, etc. selects a model by which insufficient or excess exposure of the leveraged product to changes in the underlying benchmark will be determined. Such a model should provide a benchmark that takes into consideration various real-world investment options for the investor.

One such model is discussed below. Other models could be used. This model is referred to herein as "Theoretical Benchmark Exposure" model, as discussed above. An assumption, underlying the Theoretical Benchmark Exposure model is that an investor seeking and benchmark return can invest in a traditional benchmark product and can theoretically leverage that return by committing its own principal and borrowed principal, i.e., money. In this scenario, K>1, and the investment is divided into principal ("P") and an investment made on margin, (borrowed money) (P*(K−1)). The portion of the investment made on margin will incur interest expense.

The return that is generated by this investment in the benchmark using principal and margin provides a baseline return. The beta adjustment of the leveraged benchmark product seeks returns that are equivalent to those of this baseline return provided by the Theoretical Benchmark Exposure model by recommending transactions among the relevant leveraged funds and cash accounts, e.g., interest bearing accounts such as money market accounts.

The Theoretical Benchmark Exposure is initially K*P and the gross Theoretical Benchmark Exposure at any subsequent point in time is (K*P*(1+X)). The gross Theoretical Benchmark Exposure is reduced by borrowing costs associated with the leveraged portion of the Theoretical Benchmark Exposure (the money borrowed to provide the leverage). The Theoretical Benchmark Exposure is not the theoretical value of the investor's investment position at a given time, but rather the Theoretical Benchmark Exposure is the theoretical exposure to the benchmark at a given time.

Therefore, the Theoretical Benchmark Exposure at any time is determined by accessing 82 the values of K, P, X, P, r and ip, as discussed above, and from these values calculating 84 Theoretical Benchmark Exposure as:

$$TBE = (K*P(1+X) - ((K-1)*(P)*(r)*(ip))$$

where "r" is the broker call rate and "ip" is the investment period, as discussed above.

Thus, if a leveraged index benchmark seeks a daily return which is the multiple of the return of a benchmark (e.g., the "TME") and the beta "B" of the leveraged benchmark is greater than the desired return "K", the initial desired market exposure (T) of an investment strategy K*P is $$K*P/B$$

with P−P*K/B being allocated to an interest bearing MM Fund.

On the other hand, the total market value (TMV) of the Leveraged Fund based on the beta adjustment strategy discussed above is the Current Value in the Investor's Leveraged Fund Account and Investor's Money Market Account or:

$$TMV = CV + Mkt$$

Money market interest is accounted and the money market balance is computed using an interest rate that is compounded daily.

The application software 40 computes the total exposure of the theoretical position (P*k*x where k=the return multiplier and x is cumulative return).

As discussed above, the amount "P" is defined as the amount of assets that e.g., the investor chooses to allocate to the strategy and the value "K" is a multiple of P that the investor desires. Therefore, the Theoretical Market Exposure (TME) is equal to K*P.

The accounting for the cost of margin can be determined by using the Broker Call Rate for each date of the investment period and determining an average daily rate for the investment period by adding the rates for each day from the start date until the current date, and dividing the sum by the number of days, and dividing that sum by 250 (the typical number of trading days in a year). This average daily rate will be multiplied by (K−1) P to determine the implicit interest expense.

Beta Adjustment Tool

Figure 6:
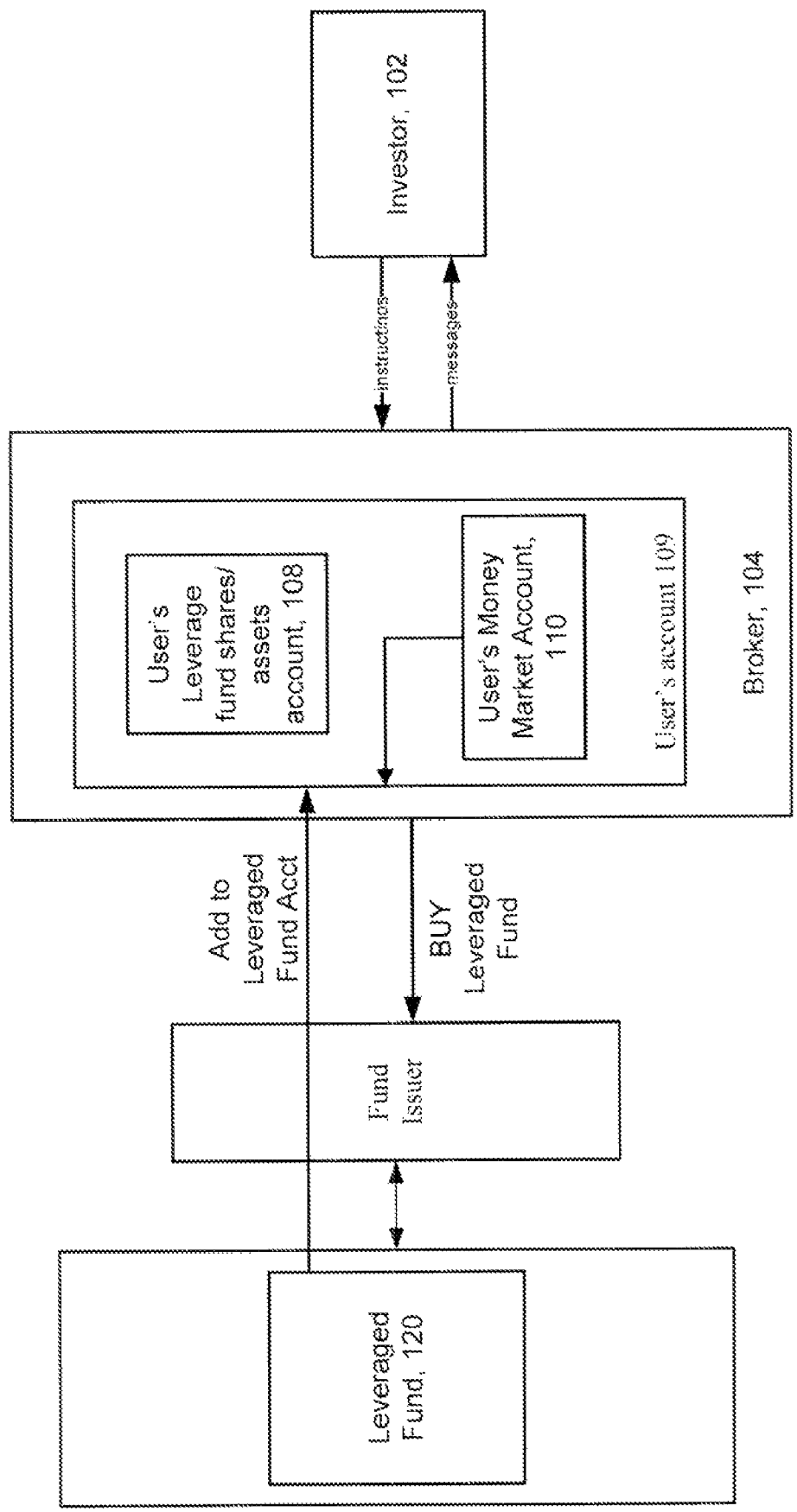
FIG. 6 is a diagram depicting exemplary transaction flow.

Referring now to FIG. 6, an investor 102 interacts with a broker/dealer 104 to view and manage the investor's assets/shares in a user's account 109 containing Investor's Leveraged Fund Account 108 and corresponding Investor's Money Market Account 110.

Although a single user, e.g., investor account is shown, it is to be understood that this is merely a simplification for illustration purposes. Money in all user's accounts resides in a Leveraged Fund 120, an investment pool comprised of funds from a plurality of investor accounts. Some of these accounts can have an Investor Leveraged Fund Account 108 and a corresponding Money Market Account 110, for investors that chose to use a re-allocation tool. Others of these accounts may only have the Investor Leveraged Fund Account 108 for those investors that do not want to participate in re-allocation.

This investment pool is invested on a daily basis in a leveraged manner according to various investment strategies adopted by the particular fund. Money that is in money market accounts (or cash, or cash equivalents) can be considered part of the Leveraged Fund 120, but is not part of the investment pool that is exposed in the leveraged manner.

Additionally, the Investor Leveraged Fund Account 108 can be processed individually, in that the Leveraged Fund 120 makes transactions only for those investors that indicate that the transactions are desired.

The tool includes a registration process (not shown) to allow an investor to register with the system and a login to allow the investor to login and access positions in the user's account containing the user's leveraged fund positions 109, e.g., the Investor's Leveraged Fund Account 108 and corresponding Investor's Money Market Account 110.

Through a user interface, (FIG. 8), the investor 102 sends messages to the broker 104 to execute, e.g., "buy trades" to allocate more funds into the Investor's Leveraged Fund Account 108 from the corresponding Investor's Money Market Account 110, by transferring funds from the Investor's Money Market Account 110 to the leveraged fund 120, as shown. In that case, money is transferred from the Investor's Money Market Account 110 to the issuer to purchase more assets from the Leveraged Fund 120, and messages are returned adding those funds to the Investor's Leveraged Fund Account 108.

Conversely, the messages (not shown) can transfer funds out of the Investor's Leveraged Fund Account 108 into the corresponding Investor's Money Market Account 110, in which case funds in the leveraged fund 120 are removed from the Fund 120 and transferred to the corresponding Investor's Money Market Account 110 and removed from the Investor's Leveraged Fund Account 108. In one embodiment, the investor receives messages from the broker 104 that suggests which types of transfers to make, if any, depending on market conditions.

Figure 7:
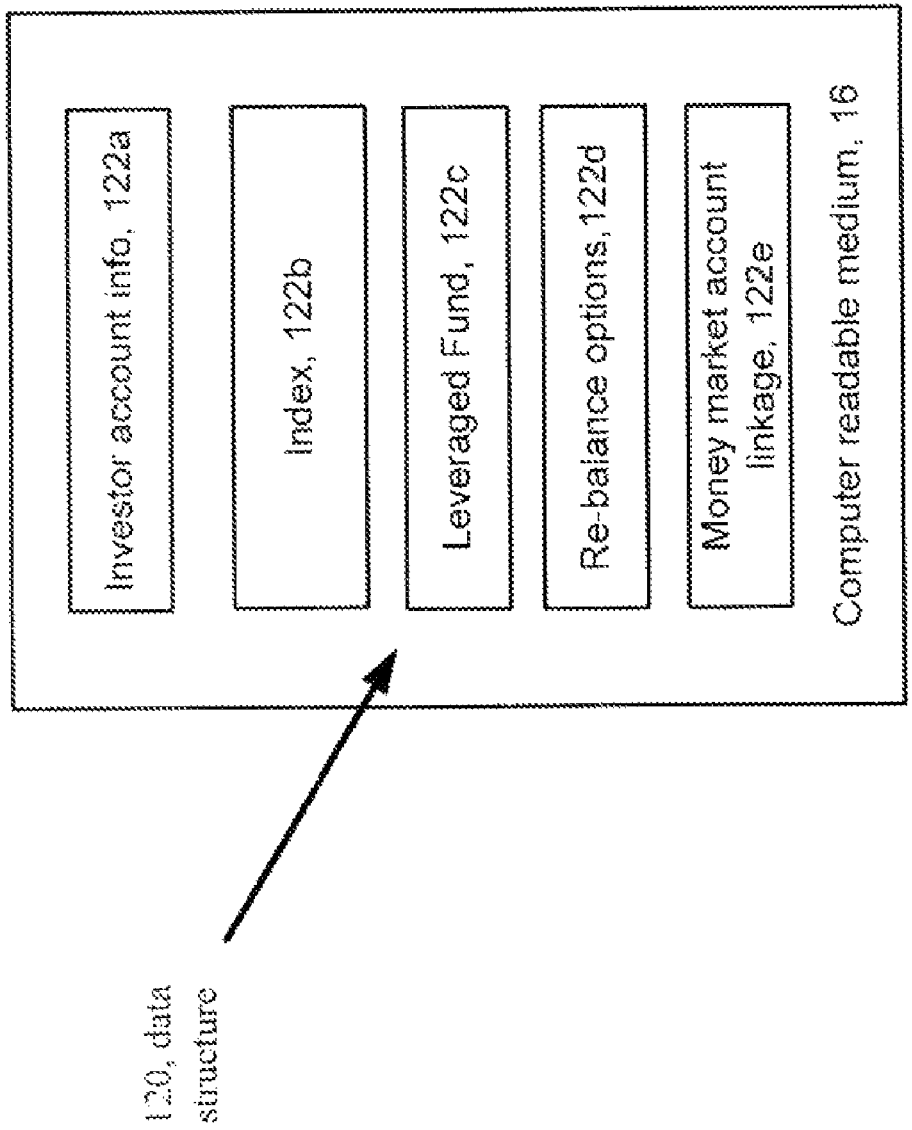
FIG. 7 is a diagram depicting a file or data structure stored on a computer readable medium.

Referring now to FIG. 7, a data structure and/or a file or object 120 can be used to maintain user account information. In addition to conventional information that can be maintained for the user, e.g., investor information, 122a, identification of the particular leveraged fund, 122b, identification of the underlying benchmark, 122c, the data structure 120 can include fields for exposure rebalancing options 122d for the account, and a linkage 122e to the underlying money market account (or equivalent) if the data structure 120 has enabled exposure rebalancing.

Figure 8:
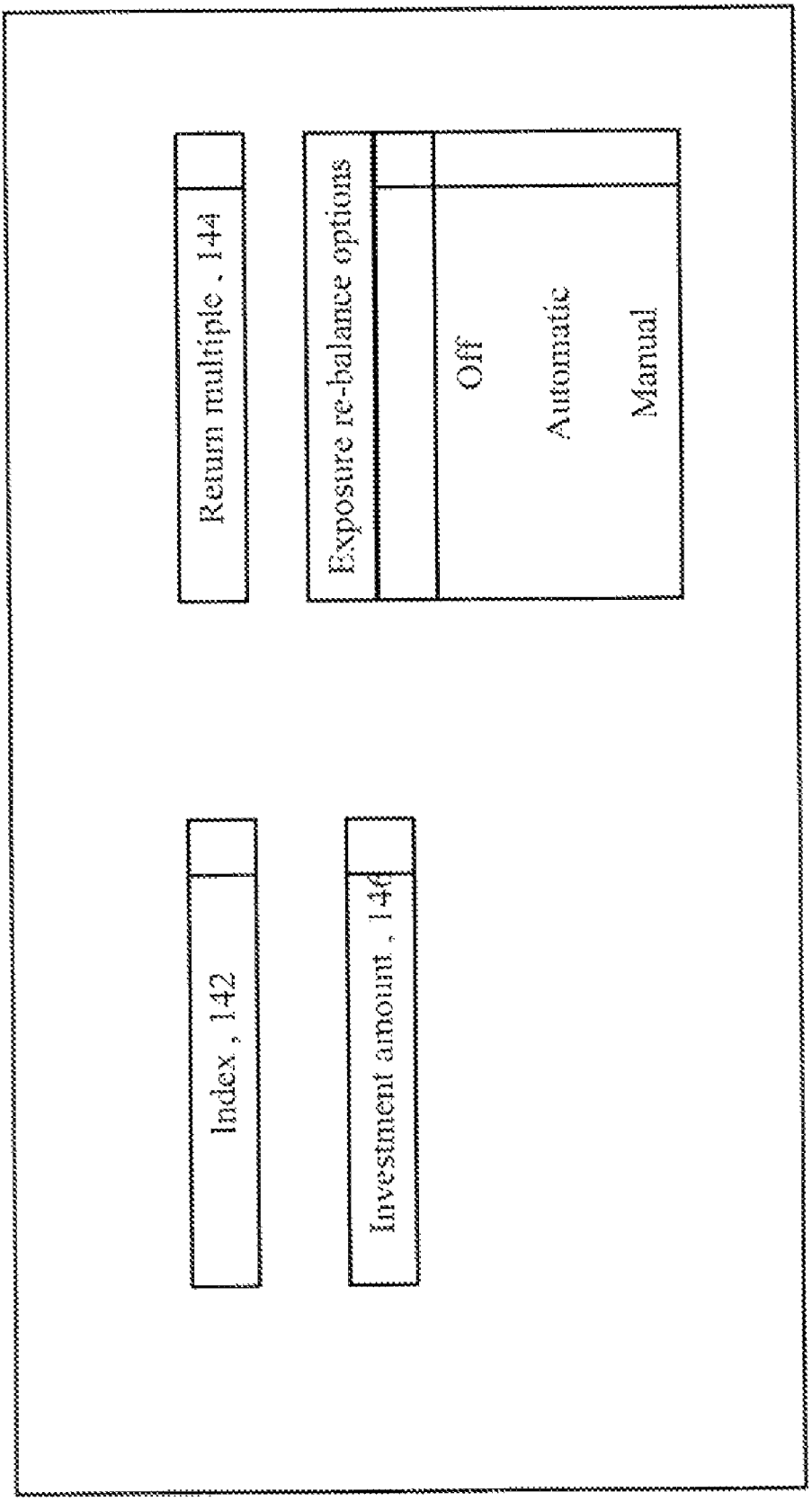
FIGS. 8-9 are diagrams depicting user interfaces.

Referring to FIG. 8, a user interface 140 for the beta adjustment tool includes a field 142 to allow an investor through a broker dealer, fund issuer, etc., to choose a benchmark, a field 144 to choose return multiple, a field 146 to specify an initial investment amount, and a field 148 to allow the user to re-balance exposure. This interface can be part of a tool that allows a user to initiate a new investment.

Other interfaces can be provided to allow the investor to thereafter track orders to be placed for the fund.

In subsequent user interfaces, after the user accesses the account, the tool provides exposure correction information to obtain up-to-date exposure correction trades to execute to accomplish the exposure correction strategy and to record exposure correction trades. The tool also allows a user to liquidate the investment.

Initiation of New Investment

Upon selection of the "Initiate new position" option, the system will allow the user to select a benchmark, an outlook (e.g., bullish or bearish) and enter the desired return multiple (K) and initial investment (P). Money market interest and margin interest rate can also be specified or system estimated default values can foe accepted. The system will use the benchmark and outlook to determine the leveraged fund to be purchased. This menu driven process permits a user to obtain the correct leveraged fund from, e.g., a family of such funds that have different characteristics, such as outlook, benchmark, and leverage.

The system allows the user to select the starting date, end date (default present), reallocation interval (daily, weekly, monthly, etc.) for an historical scenario. The same information is collected as in the "initiate new position" feature (benchmark, outlook, K, P) above. The system will process the scenario using the exposure correction discussed above, generating a detailed view of the periodic investment reallocation activities and the net results (benchmark move, net investment return, capital costs, etc).

Exposure Correction

Figure 9:
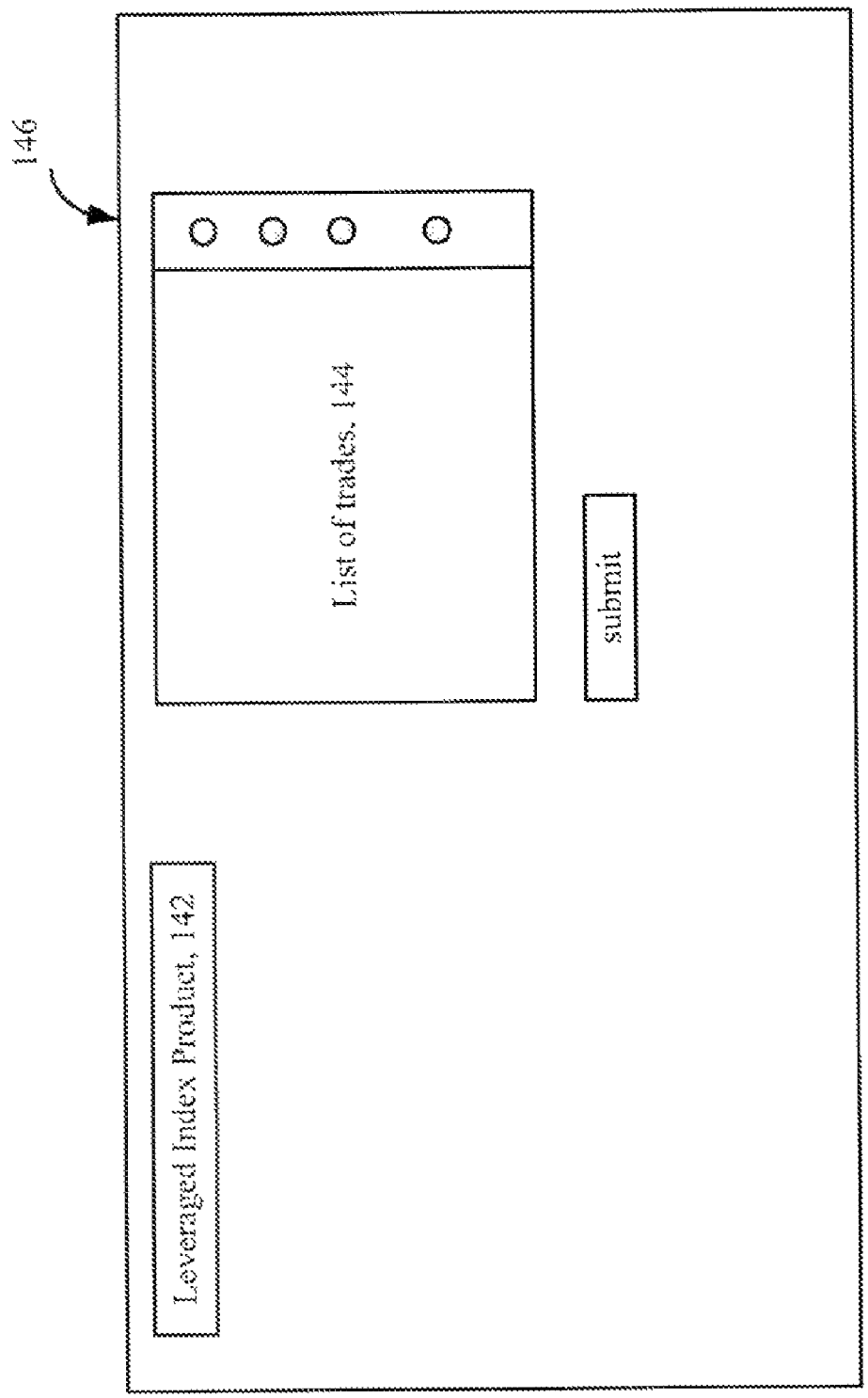

Referring now to FIG. 9, an exposure correction user interface 140 is shown. This user interface 140 displays a listing 142 of all funds and exposure correction trades that need to be made. The exposure correction user interface 140 originates from a broker/dealer system 160 (FIG. 9) or the issuer's system 164 (FIG. 9). Such system (162, 164) generates the screens based on a feed of current day market movements.

In one embodiment, the system 160 or 164 does not auto-update the screen because if the user places trades well before closing, the exposure correction displayed when the user accepted the trade may be different from exposure correction based on market closing values.

Figure 10:
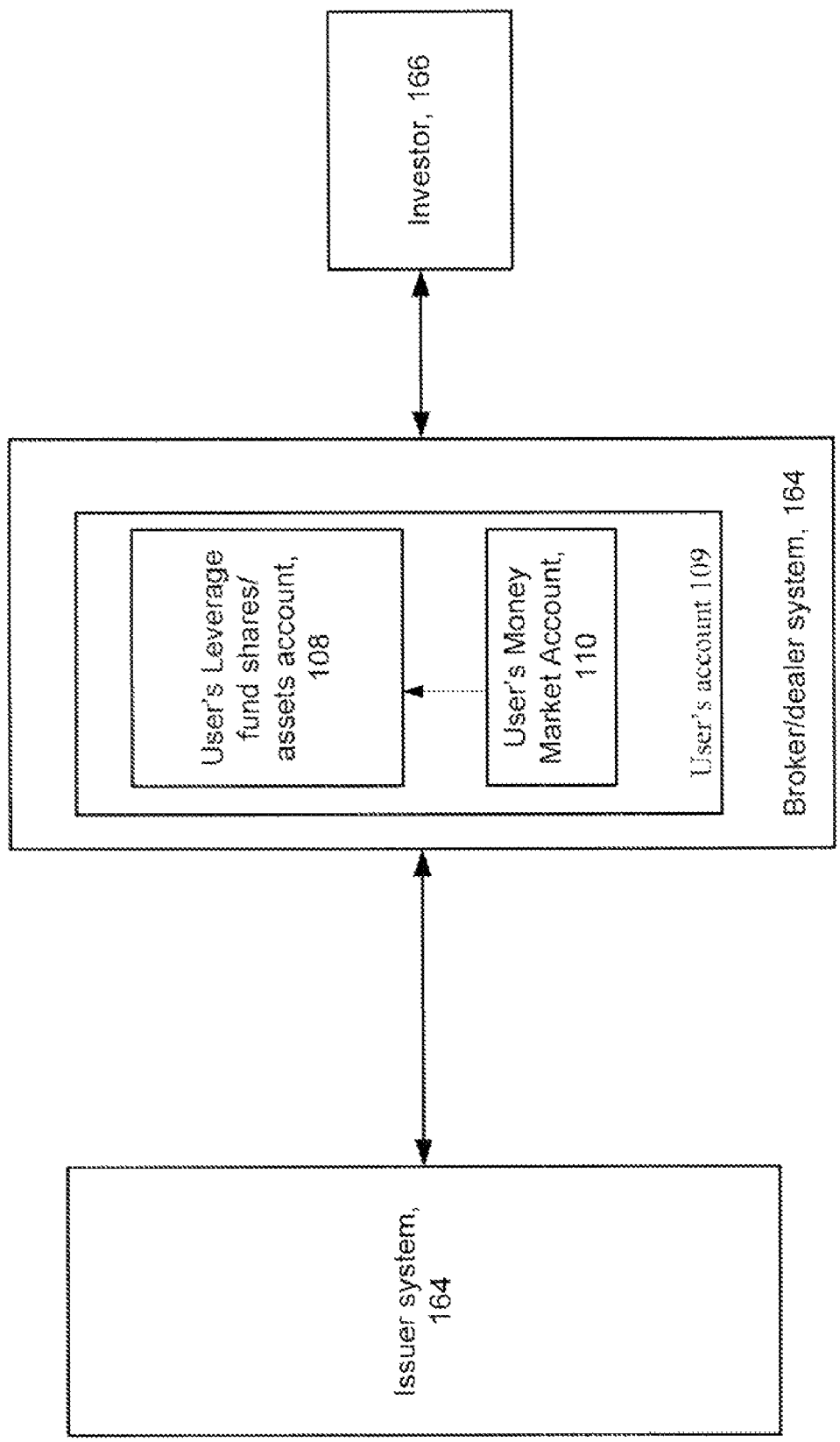
FIG. 10 is a block diagram.

Referring now to FIG. 10, an exemplary arrangement is shown. In this arrangement a broker dealer system 162 is in communication with an issuer's system 164 and a user's (e.g., investor's) system 166. In response to the user clicking a "submit" for exposure correction orders 146 (FIG. 9) of a given position, the broker/dealer 162 (or issuer system 164) will record in dollars the amount of lands (leveraged fund 108 and money market account 110) being purchased or sold in the user's account 109, as maintained on the broker/dealer's system 164.

Upon receipt of a net asset value message at the close of market, the system 164 will compute the new share balance in the leveraged fund account 108 for that investor. The system 164 will send messages to the investor's system 166, to display the investment allocation between the leveraged fund 108 and the money market 110 for that investor. The broker/dealer 164 (or issuer system 162) records the closing value of the benchmark to use as the base for computing cumulative returns.

There are recurring processes that occur in administration of user accounts by broker dealers, and/or issuers. For instance, the daily Broker call rate will be globally recorded for future Theoretical Market Exposure calculations. The index values are recorded daily to maintain the ability to perform the transactions.

Integrated Beta Adjustment Trading

The beta adjustment tool can be integrated with a trading platform. In one manner, the integration can be such that investors who are not interested in the beta adjustment strategy are unaffected, whereas, investors seeking to initiate beta adjustments are able to use the same concepts and paradigms across traditional holdings and beta adjustment holdings.

Screens that display current holdings may show the beta adjustment strategy position as another fund distinct from any additional equity that may be held in the same fund.

A number of embodiments of the invention have been described. Nevertheless, it will be understood that various modifications may be made without departing from the spirit and scope of the invention. For instance, although the embodiments have been described with reference to equities and equity indexes, other leveraged products that are based on an index could use the tools described herein. For instance, the products could be bonds, commodities, real property and so forth. Accordingly, other embodiments are within the scope of the following claims.

What is claimed is:

1. A computer implemented method comprises:
periodically calculating by one or more computer systems, a theoretical position in an underlying index that corresponds to an index used in a leveraged index product; and
based on the theoretical position,
determining by the one or more computer systems a level of investment in a leveraged index product customer account that is required to provide substantially the same exposure to the underlying index as the exposure provided by the theoretical position; and
determining by the one or more computers an amount of funds to re-allocate between the leveraged index product customer account and a cash or cash equivalent account according the determined theoretical position.

2. The method of claim 1 further comprises:
determining whether to recommend a transaction to re-allocate the funds; and
sending by the one or more computer systems a message with the recommended transaction.

3. The method of claim 1, further comprising:
executing a transaction to re-allocate funds between the leveraged index product account and the cash or cash equivalent account according to the determined theoretical position in the underlying index.

4. The method of claim 1 wherein a return provided from the aggregate of investment in the cash equivalent account and the leveraged index product account over a time period is substantially equivalent to a multiple of the return of the theoretical position in the index over the period of time.

5. The method of claim 1 wherein calculating the theoretical position comprises:
calculating a Theoretical Benchmark Exposure by:
selecting a model to provide the exposure of the theoretical position in the underlying index corresponding to the index used in the leveraged index product.

6. The method of claim 1 further comprises:
determining a desired investment in a leveraged index product based on the theoretical position in the underlying index;
comparing the desired investment in the leveraged index product to the current value of funds in the leveraged index product customer account; and if the current value of funds in the leveraged index product exceeds the desired value by more than a specified tolerance,
sending a message to recommend a transfer of funds from the leveraged index product account to the cash equivalent account.

7. The method of claim 1 further comprises:
determining a desired investment in a leveraged index fund based on the theoretical position in the underlying index;
comparing the desired investment in a leveraged index product to the current value of funds in the leveraged index product customer account; and if the current value of funds in the leveraged index product exceeds the desired value by more than a specified tolerance,
using an automated system to transfer funds from the leveraged index product account to the cash equivalent account.

8. The method of claim 1 further comprises:
determining a desired investment in a leveraged index product based on the theoretical position in the underlying index;

comparing the desired investment in a leveraged index product to the current value of funds in the leveraged index product account; and if the desired value of funds in the leveraged index product exceeds the current value by more than a specified tolerance, sending a message to recommend a transfer of funds from the cash equivalent account to the leveraged index product account.

9. The method of claim 1 further comprises:

determining a desired investment in a leveraged index product based on the theoretical position in the underlying index;

comparing the desired investment in the leveraged index product to the current value of the funds in the leveraged index product account; and if the desired value of funds in the leveraged index product exceeds the current value by more than a specified tolerance, using an automated system to transfer funds from the cash equivalent account to the leveraged index product account.

10. The method of claim 2 wherein the cash equivalent account is a money market account that is linked to the leveraged index product account.

11. The method of claim 1 wherein the theoretical position in the underlying index is a Theoretical Benchmark Exposure (TBE) determined according to:

$$(TBE) = K*P*(1+X) - ((K-1)*(P)*(r)*(ip));$$

where "P" is an amount of allocated assets; "K" is an leverage multiple of P; where the value of K is less than a beta of the leveraged fund; "X" is the return of the underlying index; "r" is the broker call rate and "ip" is the investment period.

12. The method of claim 2 further comprising:

accessing the cash equivalent account and the leveraged index product account for determining whether to initiate a transaction.

13. The method of claim 1 wherein periodically calculating occurs on days that the market for securities in the underlying index is open.

14. A computer program product residing on a computer readable medium for rebalancing exposure to an underlying index in a leveraged index product comprises instructions for causing a computer to:

periodically calculate, a theoretical position in an underlying index that corresponds to an index used in a leveraged fund; and based on the theoretical position, determine a level of investment in a leveraged index product customer account that is required to provide substantially the same exposure to the underlying index as the exposure provided by the theoretical position in the underlying index; and determine an amount of funds to re-allocate between the leveraged index product customer account and a cash or cash equivalent account according the determined theoretical position.

15. The computer program product of claim 14, further comprising instructions to:

determine whether to initiate a transaction to re-allocate funds; and send a message with the recommended transaction.

16. The computer program product of claim 14, further comprising instructions to:

execute the determined transaction to re-allocate funds between the leveraged index product account and the cash or cash equivalent account according to the theoretical position in the underlying index.

17. The computer program product of claim 14, wherein the instructions, when executed, provide a return from the aggregate of investment in the cash equivalent account and the leveraged index product account over a time period that is substantially equivalent to a multiple of the return of the index.

18. The computer program product of claim 14 wherein instructions to determine whether to initiate a transaction further comprise instructions to:

determine a desired investment in a leveraged index product based on the theoretical position in the underlying index;

compare the desired investment in a leveraged index product to the current value of funds in the leveraged index product customer account; and if the current value of funds in the leveraged index product customer account exceeds the desired investment by more than a specified tolerance, send a message to recommend a transfer of funds from the leveraged index product customer account to the cash or cash equivalent account.

19. The computer program product of claim 14 wherein instructions to determine whether to initiate a transaction further comprise instructions to:

determine a desired investment in a leveraged index product based on the theoretical position in the underlying index;

compare the desired investment in the leveraged index product to the current value of the funds in the leveraged index product customer account; and if the current value of funds in the leveraged index product customer account exceeds the desired investment by more than a specified tolerance, use an automated system to transfer funds from the leveraged index product customer account to the cash or cash equivalent account.

20. The computer program product of claim 14 wherein instructions to determine whether to initiate a transaction further comprise instructions to:

determine a desired investment in a leveraged index product based on the theoretical position in the underlying index;

compare the desired investment in a leveraged index product to the current value of the funds in the leveraged index product customer account; and if the desired value of funds in the leveraged index product customer account exceeds the current investment by more than a specified tolerance, send a message to recommend a transfer of funds from the cash or cash equivalent account to the leveraged index product customer account.

21. The computer program product of claim 14 wherein instructions to determine whether to initiate a transaction further comprise instructions to:

determine a desired investment in a leveraged index product based on the theoretical position in the underlying index;

compare the desired investment in a leveraged index product to the current value of the funds in the leveraged index product customer account; and if the desired value of funds in the leveraged index product customer account exceeds the current investment by more than a specified tolerance, use an automated system to transfer a portion of funds in the cash or cash equivalent account to the leveraged index product customer account.

22. The computer program product of claim 14 wherein the cash equivalent account is in a money market account that is linked to the leveraged index product customer account.

23. The computer program product of claim 14 wherein the theoretical position in the underlying index is a Theoretical Benchmark Exposure (TBE) determined according to:

$$(TBE) = K*P*(1+X) - ((K-1)*(P)*(r)*(ip)).$$

where "P" is an amount of allocated assets; "K" is an leverage multiple of P; where the value of K is less than a beta of the leveraged fund; "X" is the return of the underlying index; "r" is the broker call rate and "ip" is the investment period.

24. A computing system comprises:
a processor; and
memory for executing along with the processor a computer program product;
a computer readable medium storing the computer program product, the computer program product for rebalancing exposure to an underlying index in a leveraged exposure product comprises instructions for causing a computer to:
   periodically calculate in the computing system, a theoretical position in an underlying index that corresponds to an index used in a leveraged index product; and based on the theoretical position,
   determine the level of investment in an leveraged index product account that is required to provide substantially the same exposure to the underlying index as the exposure provided by the theoretical position in the underlying index;
   determine an amount of funds to re-allocate between the leveraged index product account and a cash or cash equivalent account according the determined theoretical position.

25. The apparatus of claim 24 wherein the computer program product further comprising instructions to:
   execute transactions to re-allocate funds between the leveraged index product account and a cash equivalent account according to the determined theoretical position in the underlying index.

26. The apparatus of claim 24 wherein the instructions, when executed, provide a return from the aggregate of investment in the cash equivalent account and the leveraged index product account over a time period that is substantially equivalent to a multiple of the return of the index over the time period.

27. A memory for storing data for access by an application program for managing leveraged index products, the application program being executed on a data processing system, comprising:
   a data structure stored in said memory, said data structure including information resident in a database used by said application program and including:
   a field identifying the leveraged index product;
   a field identifying a cash account;
   a field identifying a leveraged fund account associated with the cash account; and
   a field identifying at least one exposure rebalancing option for the leveraged product account;
   the data structure when accessed by the application program;
   configures the application program to determine an amount of funds to re-allocate between the leveraged index product customer account identified by the leveraged fund account field and the cash or cash equivalent account identified by the cash account field according to a theoretical position determined by the application program; and
   configures the application program to provide at least one rebalancing option according the rebalancing option field.

28. The memory of claim 27, wherein the field that identifies exposure rebalancing options identifies that an owner of the account accepts automatic exposure rebalancing.

29. The memory of claim 27, wherein the field that identifies exposure rebalancing options identifies that an owner of the account accepts messages to recommend transactions for exposure rebalancing.

30. The memory of claim 27, wherein in the data structure the field identifying the cash account is linked to the field identifying the leveraged fund account associated with the cash account.

31. A computer implemented method of rebalancing an investment return in a magnified index product, the method comprises:
   receiving by a computer an exposure magnification factor for a cash amount in a leveraged index product account, the leveraged index product account associated with a cash equivalent account,
   calculating by a computer a leveraged index benchmark exposure to an underlying index that is based on the cash amount and the magnification factor,
   calculating by a computer a theoretical benchmark exposure that is based on a return of the underlying index, a current cash amount, and the magnification factor, and
   re-allocating by a computer the cash amount in the leveraged index product account and cash in the cash equivalent account to provide the cash amount in the leveraged index product account with an exposure to the underlying index provided by the leveraged index product that is about equivalent to the theoretical benchmark exposure.

32. The method of claim 31 wherein the theoretical benchmark exposure is calculated daily.

33. The method of claim 31 wherein the magnification factor comprises a first magnification factor associated with the leveraged index product and a second magnification factor associated with the leveraged index product account.

34. The method of claim 33 wherein the second magnification factor is a percentage of the value of the first magnification factor.

35. The method of claim 31 wherein re-allocating comprises computing a desired investment using the theoretical benchmark exposure and the magnification factor.

36. The method of claim 35 wherein re-allocating comprises computing a differential value using the magnification factor, the desired investment, and the leveraged index benchmark exposure.

37. The method of claim 36 wherein re-allocating comprises calculating by a computer a threshold percentage based on the differential value and the current value of the leveraged index product account.

38. The method of claim 37 wherein re-allocating comprises re-allocating if the threshold percentage is above a predetermined value.

39. A computer program product residing on a computer readable medium for rebalancing an investment return in a magnified index product comprises instructions for causing a computer to:
   receive an exposure magnification factor for a cash amount in a leveraged index product account, the leveraged index product account associated with a cash equivalent account, calculate a leveraged index benchmark exposure to an underlying index that is based on the cash amount and the magnification factor, calculate a theoretical benchmark exposure that is based on a return of the underlying index, a current cash amount, and the magnification factor, and re-allocate the cash amount in the leveraged index product account and cash in the cash equivalent account to provide the cash amount in the leveraged index product account with an exposure to the underlying index provided by the leveraged index product that is about equivalent to the theoretical benchmark exposure.

40. The computer program product of claim 39 wherein the instructions cause a computer to calculate the theoretical benchmark exposure daily.

41. The method of claim 39 wherein the magnification factor comprises a first magnification factor associated with the leveraged index product and a second magnification factor associated with the leveraged index product account.

42. The method of claim 39 wherein the instructions to re-allocate compute a desired investment using the theoretical benchmark exposure and the magnification factor.

* * * * *